(12) United States Patent
Kirschenbaum et al.

(10) Patent No.: US 6,922,317 B2
(45) Date of Patent: Jul. 26, 2005

(54) MAGNETIC FLUX CLOSURE LAYER FOR LAMINATED MAGNETIC SHIELDS OF MAGNETIC HEADS

(75) Inventors: Leif Stefan Kirschenbaum, San Francisco, CA (US); Peter VanderSalm Koeppe, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 10/340,329

(22) Filed: Jan. 10, 2003

(65) Prior Publication Data

US 2004/0136119 A1 Jul. 15, 2004

(51) Int. Cl.[7] .................................................. G11B 5/39
(52) U.S. Cl. ....................................................... 360/317
(58) Field of Search ................................. 360/126, 317

(56) References Cited

U.S. PATENT DOCUMENTS

| | | | | |
|---|---|---|---|---|
| 5,751,526 A | 5/1998 | Schemmel | .................. | 360/113 |
| 5,861,220 A | 1/1999 | Coughlin | ............. | 428/694 TM |
| 6,069,775 A | 5/2000 | Chang et al. | ................ | 360/126 |
| 6,134,079 A | 10/2000 | Koshikawa | .................. | 360/126 |
| 6,269,533 B2 | 8/2001 | Dugas | ..................... | 29/603.13 |
| 6,358,757 B2 | 3/2002 | Anthony | ......................... | 438/3 |
| 6,430,009 B1 * | 8/2002 | Komaki et al. | ............. | 360/319 |
| 2002/0055190 A1 | 5/2002 | Anthony | ......................... | 438/3 |

FOREIGN PATENT DOCUMENTS

JP           11096520 A    10/2000

OTHER PUBLICATIONS

High Frequency Characterization and Recording Performance of NiFe and Laminated FeN Heads by (Ben) H.L. Hu, Walt E. Weresin, D. Horne, T. Gallagher, N. Robertson and M. Re, IEEE Transactions on Magnetics, Vo. 32, No. 5, Sep. 1996.

Magnetic Properties of Fe(N)/NiFe(N) Sputtered on Sloping Surfaces by R.E. Jones, Jr., C.J. Spector, J.L. Williams and C–J. Lin, IEEE Transactions on Magnetics, vol. 32, No. 5, Sep. 1996.

FeN/Ta Multilayers: Magnetic Properties and Application to Magnetic Recording Heads by Young K. Kim and Charles Partee, IEEE Transactions on Magentics, vol. 33, No. 5, Sep. 1997.

\* cited by examiner

*Primary Examiner*—A. J. Heinz
(74) *Attorney, Agent, or Firm*—Robert O. Guillot; Intellectual Property Law Offices

(57) ABSTRACT

A magnetic head including a flux closure layer that functions with a magnetic shield layer to reduce the flow of magnetic flux from the edge of the magnetic shield to an MR sensor element of the magnetic head. The flux closure layer is disposed adjacent to the magnetic shield to prevent magnetic flux leakage from the edges of the magnetic shield from flowing to the MR sensor element and create unwanted signal noise.

31 Claims, 2 Drawing Sheets

MAGNETIC FLUX CLOSURE LAYER FOR LAMINATED MAGNETIC SHIELDS OF MAGNETIC HEADS

BACKGROUND OF THE INVENTION

1. Field of the Invention

The present invention relates generally to magnetic shields for read heads of magnetic sensors, and more particularly to a flux closure layer that reduces sensor noise from edge flux leakage of magnetic shields.

2. Description of the Prior Art

As is well known to those skilled in the art, the fabrication of magnetic heads having read head elements and write head elements involves the deposition and shaping of a plurality of thin film layers of various materials utilizing photolithographic, etching and other process steps. The read head elements and write head elements are fabricated on the surface of a substrate base, and after fabrication, the substrate is sliced in such a manner as to create the magnetic heads. In typical prior art tape head fabrication processes, read head elements and write head elements may be fabricated adjacent to or on top of each other and aligned so as to create a linear sensor element of a tape drive head when the fabrication process is complete, or the read head elements and write head elements may be fabricated one on top of the other to form a magnetic head of a hard disk drive. The focus of the present invention is upon the fabrication and composition of the magnetic shield structure of the read head element.

Regarding the magnetic shield layer, it is known in the prior art that where the layer is composed of a homogenous material such as permalloy, that it will have superior magnetic shielding properties; however this material is quite ductile and metal bridging problems are known to occur during head polishing and also with wear from usage, that can result in electrical shorting by the permalloy across an insulation layer to the sensor elements of the magnetic head. It is likewise known in the prior art that where the magnetic shield layer is composed of a harder, less ductile layer, bridging and electrical shorting are not a problem. However, such a shield may be less magnetically stable than a permalloy shield, and additionally, such a shield may be susceptible to corrosion and degraded performance where a permalloy shield is not. A prior art shield that resolves some of these problems involves the fabrication of a laminated shield, in which alternating thin film layers of nitrided permalloy and Fe are sequentially deposited. A specific laminated, nitrided shield layer of the prior art includes an Fe(N) 600 Å, NiFe(N) 200 Å laminated layer, in which this two sublayer lamination is repeated a plurality of times to create the shield layer. A problem with such a laminated magnetic shield is that magnetic flux can leak from the edges of the laminations of the magnetic shield. This edge flux can flow to the MR sensor element and cause unwanted signal noise, thus degrading the performance of the magnetic head. As is described below, the present invention involves an improvement in the magnetic shield structure in which a flux closure layer is deposited next to the laminated magnetic shield. The flux closure layer serves to prevent the edge flux from the laminated magnetic shield from flowing to the MR element, thereby reducing the signal noise present in the prior art laminated magnetic shield design.

SUMMARY OF THE INVENTION

The present invention includes tape recording heads and hard disk drive magnetic heads having improved read head elements. The improvements in the read heads relate to the fabrication of a flux closure layer that functions with a laminated magnetic shield layer to reduce the flow of magnetic flux from the edges of the laminated magnetic shield to the MR sensor element of the magnetic head.

In the present invention the magnetic shield layer is fabricated as at least one and generally a plurality of laminated layers, in which each layer may include a sublayer thickness of a material such as Fe(N) and a sublayer thickness of a material such as NiFe(N). A problem with such laminated magnetic shields is that the edges of the laminations can have significant magnetic flux leakage. This magnetic flux can flow to the MR sensor element and create unwanted signal noise. To prevent this from occurring, a layer of relatively magnetically soft material, termed a flux closure layer herein, is deposited adjacent to the laminated magnetic shield layer. The flux closure layer is preferably, though not necessarily, deposited between the MR sensor element and the laminated magnetic shield layer. The flux closure layer of the present invention can be employed with respect to any magnetic shield of a magnetic head.

In an examplary embodiment, an insulation layer (G2) is deposited upon the MR sensor element, the flux closure layer is deposited upon the G2 insulation layer, and the laminated magnetic shield is deposited upon the flux closure layer. In an alternative embodiment, the laminated magnetic shield is deposited upon the G2 insulation layer and the flux closure layer is deposited upon the laminated magnetic shield. The flux closure layer is preferably formed from a relatively magnetically soft material such as permalloy (NiFe 80/20) or another relatively magnetically soft material such as CZT (cobalt, zirconium, tantalum). The thickness of the flux closure layer is generally a function of several parameters, such as the composition and structure of the laminated magnetic shield, the thickness of the insulation layer and the material comprising the flux closure layer. Generally, the thickness of the flux closure layer will be from 100 nanometers to 5 micrometers, and generally not thicker than the thickness of the laminated magnetic shield. It is preferably fabricated by the sputter deposition of an NiFe seed layer followed by the electroplating of the NiFe flux closure layer.

It is an advantage of the magnetic head of the present invention that it includes a magnetic shield structure having improved magnetic shield properties.

It is another advantage of the magnetic head of the present invention that it includes a magnetic shield structure including a laminated magnetic shield layer and a flux closure layer that reduces signal noise of the MR sensor of the magnetic head.

It is a further advantage of the magnetic head of the present invention that it includes a laminated magnetic shield layer and a flux closure layer that reduces the effects of magnetic edge flux of the laminated magnetic shield layer.

It is an advantage of the tape drive of the present invention that it includes a tape head of the present invention having a magnetic shield structure having improved magnetic shield properties.

It is another advantage of the tape drive of the present invention that it includes a tape head of the present invention that includes a laminated magnetic shield layer and a flux closure layer that reduces the effects of magnetic edge flux of the laminated magnetic shield layer.

It is a further advantage of the tape drive of the present invention that it includes a tape head of the present invention that includes a laminated magnetic shield structure including a laminated magnetic shield layer and a flux closure layer that reduces signal noise of the MR sensor of the magnetic head.

It is an advantage of the magnetic head fabrication process of the present invention that an improved magnetic head is provided through the use of known head fabrication methods, such that no new substances are introduced into the fabrication process.

It is an advantage of the hard disk drive of the present invention that it includes a magnetic head of the present invention having a magnetic shield structure having improved magnetic shield properties.

It is another advantage of the hard disk drive of the present invention that it includes a magnetic head of the present invention that includes a laminated magnetic shield layer and a flux closure layer that reduces the effects of magnetic edge flux of the laminated magnetic shield layer.

It is a further advantage of the hard disk drive of the present invention that it includes a magnetic head of the present invention that includes a laminated magnetic shield structure including a laminated magnetic shield layer and a flux closure layer that reduces signal noise of the MR sensor of the magnetic head.

These and other features and advantages of the present invention will no doubt become apparent to those skilled in the art upon reading the following detailed description which makes reference to the several figures of the drawing.

IN THE DRAWINGS

The following drawings are not made to scale of an actual device, and are provided for illustration of the invention described herein.

DETAILED DESCRIPTION OF THE PREFERRED EMBODIMENTS

Figure 1:
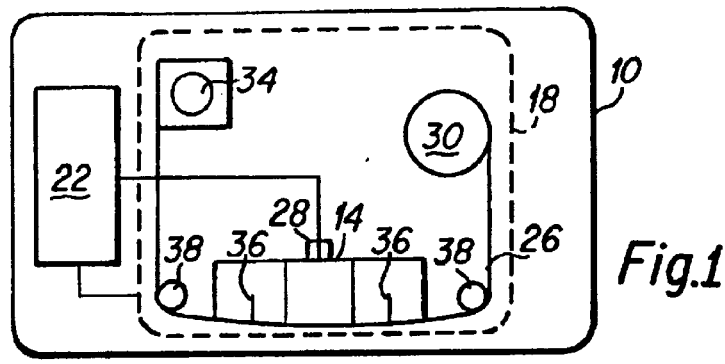
FIG. 1 is a generalized depiction of a magnetic tape drive.

FIG. 1 is a top plan view that generally depicts a magnetic tape drive 10 having a tape recording head 14 which provides a general background for the present invention. As depicted in FIG. 1, the magnetic tape drive 10 generally includes at least one magnetic tape recording device 18 with a control unit 22 for controlling the motion of various components of the magnetic tape recording device 18 and for managing the data that is written to or read from the magnetic tape 26 within the magnetic tape recording device. The magnetic tape recording device 18 generally includes the magnetic tape recording head 14 mounted upon an actuator 28, a tape supply reel 30 and a tape take-up reel 34 for transporting the magnetic tape 26 across the head. The head 14 includes two sensor element strips 36 that include a plurality of sensor elements (described herebelow) that function to write data to and read data from the magnetic tape 26. The tape recording device 18 further includes tape movement control devices 38 for controlling the tape as it approaches the head 14.

Figure 2:
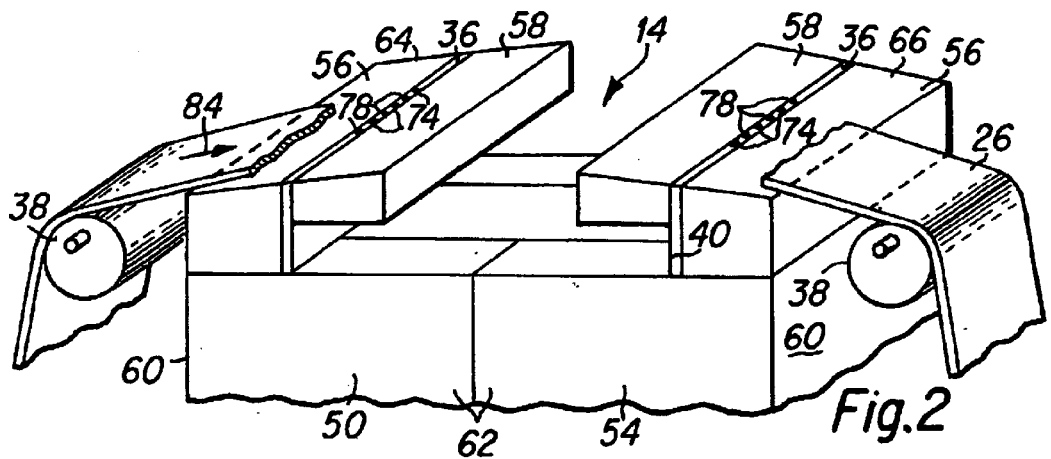
FIG. 2 is a perspective view of one type of tape recording head that includes the novel features of the present invention.

FIG. 2 is a perspective view of a linear tape recording head 14 having a recording tape 26 disposed thereon. The tape recording head 14 depicted in FIG. 2 is a flat contour linear tape recording head that includes a left sensor block element 50 and a right sensor block element 54. Each sensor block 50 and 54 includes a wafer substrate portion 56 having a sensor element strip 36 formed thereon, a cover piece 58 that is bonded to the upper portion of the sensor strip 36 to cover it, and a lower U-shaped base 60 having projecting ends 62. The ends 62 of the base pieces 60 are bonded together utilizing an appropriate adhesive. The present invention is not to be limited to such flat contour linear tape recording heads, and it is applicable to many types of recording heads, as will be understood by those skilled in the art upon reading further.

A plurality of discrete sensor elements 74 and 78 are fabricated in the sensor element strip 36 in the top surface 64 and 66 of each of the left block 50 and right block 54, respectively. In a standard type of tape head, the discrete sensor elements 74 and 78 are formed as read head elements 74 and write head elements 78 that are preferably fabricated in alternating manner within the linear sensor strip 36. Furthermore, the sensor elements 74 and 78 are oppositely disposed with regard to the left sensor block 50 and right sensor block 54. Therefore, when the tape 26 is moving toward the right (see arrow 84), a write element 78 in the left block 50 can write data onto the tape 26 and a read element 74 in right block 54 can subsequently read the data written by the write element 78. Others types of tape head designs are known which include differing arrangements of read head elements and write head elements, and the present invention is generally applicable to such tape heads. Additionally, other types of magnetic sensor element designs are known to those skilled in the art, and the present invention may be utilized in such designs, as are described herebelow.

Figure 3:
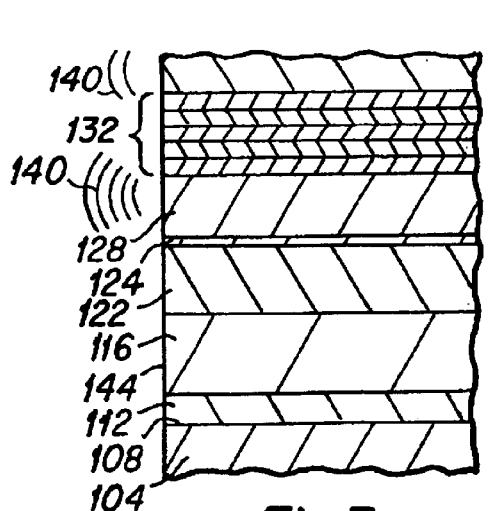
FIG. 3 is a side cross-sectional view depicting a prior art read head of a tape head.

As is well known to those skilled in the art, the sensor strip 36 is cut from a larger substrate upon which a plurality of such sensor strips are simultaneously fabricated, and FIG. 3 is a side cross-sectional view depicting the fabrication of a portion of a prior art sensor strip upon a substrate 104 that includes a read head element 74. As depicted in FIG. 3, a substrate base 104, which may be a wafer composed of a substance such as AlTiC ($Al_2O_3$, Ti, C) has an upper surface 108 upon which a plurality of thin film layers are deposited and fabricated to create the read head and write head elements of the present invention. Initially, an insulation layer 112, typically composed of $Al_2O_3$, is deposited across the surface 108 of the wafer. Thereafter, a discrete read head first magnetic shield (S1) 116 is fabricated upon the insulation layer 112 at each of the read head locations. The S1 shield may be comprised of a material such as AlFeSi, that is well known to those skilled in the art.

Following the fabrication of the S1 shield 116 an electrical insulation layer (G1) 122 is deposited and a magnetoresistive (MR) read head sensor element 124 is fabricated in a plurality of process steps upon the GI insulation layer 122 at the location of each of the read heads. Following the fabrication of the MR sensor elements 124 another electrical insulation layer (G2) 128 is deposited, and a laminated layer 132 that functions as a second read head magnetic shield (S2) 132 is fabricated upon the G2 insulation layer 128 at the locations of the read head elements.

Following the fabrication of the laminated magnetic shield 132, further layers are deposited and fabricated to create the write heads 78, such layers including a first magnetic pole layer, a write gap layer, induction coil layers and a second magnetic pole (P2), of the write head, as are well known to those skilled in the art. Following the fabrication of the write head components, further fabrication steps are conducted to complete the fabrication and encapsulation 148 of the read head and write head elements, and the substrate 104 is ultimately sliced into the discrete magnetic head sensor elements 36 that are subsequently incorporated into the tape recording heads.

With regard to the prior art magnetic shield 132 that is depicted in FIG. 3, it is composed of a plurality of laminated layers such as Fe(N) and NiFe(N). A significant problem that can exist with such laminated magnetic shields 132 is that unwanted magnetic flux 140 can leak from the edges of the individual laminations. This magnetic flux leakage 140 can be a particular problem at the ABS surface 144 of the magnetic head due to the close proximity of the MR element 124. Particularly, as depicted in FIG. 3, magnetic flux leakage 140 from the lamination edges can flow outward from the edges and across the G2 insulation layer 128, to the MR element 124. This magnetic flux 140 can create unwanted problems for the MR element such as signal noise and an alteration of the bias point of the MR element. As has been indicated hereabove, the flux closure layer of the present invention seeks to prevent such problems, and a detailed description of the present invention is next presented with the aid of FIG. 4.

Figure 4:
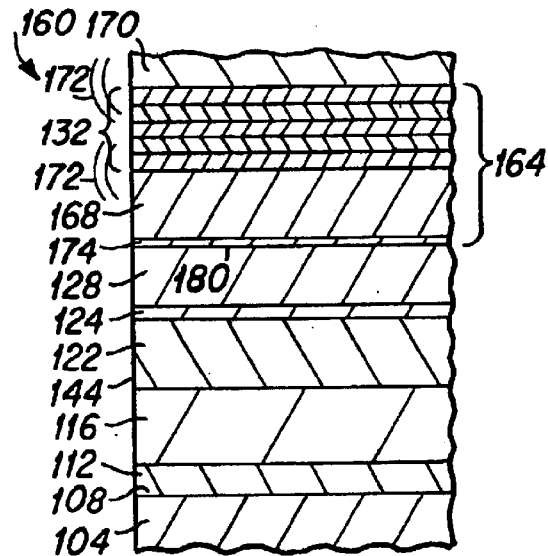
FIG. 4 depicts a magnetic head including a laminated magnetic shield layer with a flux closure layer of the present invention.

FIG. 4 is an enlarged cross-sectional view depicting a magnetic head 160 of the present invention having a preferred magnetic shield structure 164 of the present invention. As depicted in FIG. 4, the G2 insulation layer 128 is deposited on top of the MR sensor element 124. Thereafter, a magnetic shield structure 164 including a layer 168 of relatively magnetically soft material, and a laminated magnetic shield layer, such as layer 132 depicted in FIG. 3, are sequentially deposited. Thereafter, further magnetic head layers and structures 170 are fabricated as are known to those skilled in the art. As depicted in FIG. 4, magnetic flux 172 that emanates from the edges of the laminated shield layers 132 now flows to the magnetic layer 168, rather than to the MR sensor element 124, whereby the layer 168 is termed a flux closure layer herein. As a result, the signal noise of the MR sensor element is reduced because the edge flux 172 from the laminated magnetic shield 132 no longer flows to the MR sensor element 124, as it did in the prior art head depicted in FIG. 3. The flux closure layer 168 is preferably comprised of a relatively magnetically soft material such as NiFe 80/20, or perhaps a somewhat harder NiFe 45/55. As will be understood by those skilled in the art, various other materials (such as CZT (cobalt, zirconium, tantalum), or pure Ni) could be used as a flux closure layer 168 depending upon the composition and operational characteristics of other components of the magnetic head 160, such as the composition and characteristics of the laminated magnetic shield 132 and the thickness of the flux closure layer 168 and the thickness of the G2 insulation layer 128. With regard to the thickness of the flux closure layer 168, as will be understood by those skilled in the art, it is affected by the composition of the flux closure layer, as well as the composition and operational characteristics of the magnetic shield layer and the thickness of the G2 insulation layer. A general thickness range for the flux closure layer 168 is from approximately 100 nanometers to approximately 5 micrometers. By way of example, a flux closure layer 168 composed of NiFe 80/20 having a thickness of approximately 3 micrometers will provide adequate flux closure characteristics in a magnetic head having a G2 gap layer thickness of approximately 167 nanometers and a laminated magnetic shield layer comprised of Fe(N) and NiFe(N) laminations with a total thickness of approximately 2.5 micrometers. The flux closure layer 168 is preferably fabricated by sputter deposition of an NiFe seed layer 174 followed by the electroplating of the remainder of the NiFe flux closure layer upon the seed layer 174.

In the embodiment of the present invention depicted in FIG. 4, the lower edge 180 of the flux closure layer 168 will generally act as the lower edge of the magnetic shield structure 164 in determining the read gap of the magnetic head 160, where the read gap is generally understood to be the distance between the S1 and S2 magnetic shields. Where the prior art magnetic head depicted in FIG. 3 may have a relatively thick G2 insulation layer in order to reduce magnetic flux leakage 140 from the laminated magnetic shield 132 to the MR element 124, the use of the flux closure layer 168 serves to reduce the magnetic edge flux that would otherwise flow to the MR sensor element. As a result, the thickness of the G2 insulation layer 128 in the preferred embodiment 160 can be reduced relative to the thickness of the G2 insulation layer in the prior art. Thus, the magnetic head 160 of the present invention retains the superior magnetic shield properties of the laminated magnetic shield, while the thickness of the G2 insulation layer can be reduced, such that the read gap of the magnetic head can be likewise reduced.

A problem that can arise with the magnetic head 160 of the present invention depicted in FIG. 4, is that the material that comprises the flux closure layer 168 is generally less wear resistant than the laminated magnetic shield material 132. It has been noted during usage of a magnetic head that the material comprising the shield may be worn such that it forms a bridge across a gap layer to the MR sensor element, thereby creating electrical shorting problems that degrade the performance of the magnetic head. Where the wear of the flux closure layer 168 is a significant issue, an alternative embodiment of the present invention can be employed in which the flux closure layer is fabricated on top of the laminated magnetic shield, and such an embodiment is next discussed with the aid of FIG. 5.

Figure 5:
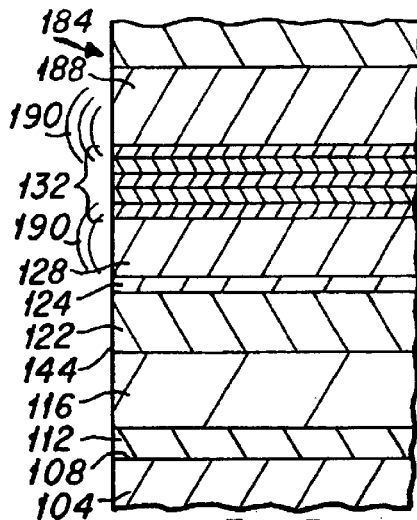
FIG. 5 depicts an alternative magnetic head including a laminated magnetic shield layer with a flux closure layer of the present invention.

As depicted in FIG. 5, an alternative magnetic head 184 of the present invention includes an MR sensor element 124 having a G2 insulation layer 128 fabricated thereon, with a magnetic shield structure 186 including a laminated magnetic shield 132 that is fabricated upon the G2 insulation layer 128, and a flux closure layer 188 that is fabricated upon the laminated magnetic shield 132. Further magnetic head layers and structures are then fabricated upon the flux closure layer 188, as are known to those skilled in the art. The materials and the thickness of the flux closure layer 188 of the magnetic head 184 depicted in FIG. 5 are generally comparable to those of the magnetic head 160 depicted in FIG. 4. That is, the flux closure layer 188 may be comprised of NiFe 80/20 or NiFe 45/55, or other generally magnetically soft materials are known to those skilled in the art. The thickness of the flux closure layer 188 is generally a function of the materials and operational parameters of the magnetic shield layer 132, and a generalized thickness range is from 100 nanometers to 5 micrometers. As can be seen in FIG. 5, the flux closure layer 188 will tend to cause the magnetic edge flux 190 from the laminated magnetic shield 132 to flow through it, although there is inherently more likelihood that some of the magnetic edge flux 190 from the laminated magnetic shield 132 will flow towards the MR sensor element 124. However, the magnetic head 184 depicted in FIG. 5 will not have as significant a bridging wear problem of the head 160 depicted in FIG. 4, in that the much more wear resistant magnetic shield laminations of Fe(N) and NiFe(N) are disposed closer to the MR element.

Figure 6:
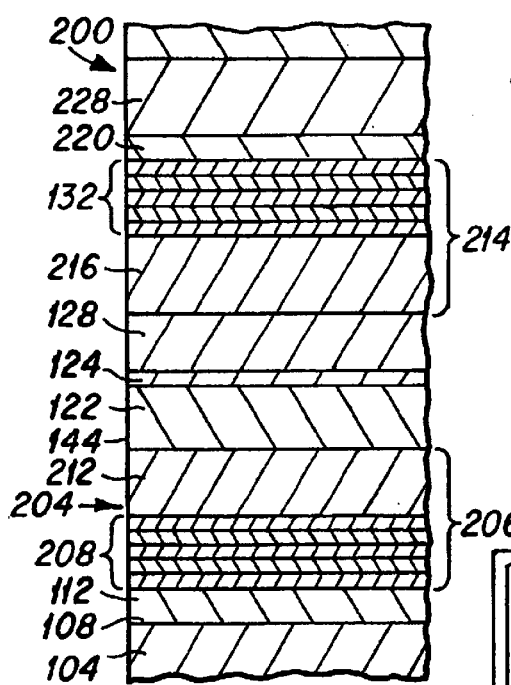
FIG. 6 depicts a merged magnetic head that may be used in a tape drive or hard disk drive of the present invention.

As indicated above, the magnetic shield structures 164 and 186 of the present invention has application in other types of magnetic head designs, and FIG. 6 is a side cross-sectional view depicting a merged magnetic head 200. As depicted in FIG. 6, the magnetic head 200 may include a read head element that is fabricated substantially identically to those depicted in FIG. 4 and described hereabove. Initially, an insulation layer 112 is deposited across the surface 108 of a substrate 104. Thereafter, a read head first shield (S1) 204 is fabricated upon the insulation layer 112 at each location. The S1 shield 204 may be comprised of a material such as AlFeSi, that is well known to those skilled in the art. Alternatively, as depicted in FIG. 6, the S1 shield 204 can also be comprised of a laminated magnetic shield structure 206 which includes a laminated magnetic shield 208 and a flux closure layer 212 that are substantially identical to magnetic shields 132 and flux closure layer 168 described above. Following the fabrication of the S1 shield 204, an electrical insulation layer (G1) 122 is deposited, followed by the fabrication of a MR sensor element 124 in a plurality of well known fabrication steps. Following the fabrication of the MR sensor element another electrical insulation layer (G2) 128 is deposited. Thereafter, a magnetic shield structure 214 including a flux closure layer 216 of the present invention is deposited, and a second laminated magnetic shield (S2) 132 is fabricated upon flux closure layer 216. At this point, a read element structure similar to that depicted in FIG. 4 has been fabricated, although it may include two magnetic shield structures 206 and 214.

A write element structure is next fabricated upon the S2 shield 132. Also well known, in a merged magnetic head 200 the S2 shield 132 is also utilized as the first magnetic pole (P1) of the write element. Therefore, following the fabrication of the S2 shield 132, which also serves as the P1 magnetic pole, a write gap layer 220, which is typically comprised of Al$_2$O$_3$, is deposited. Following the fabrication of the write gap layer 220, a write head induction coil structure (not shown) is fabricated. Thereafter, the second magnetic pole (P2) 228 is fabricated over the induction coil structure, such that the pole tip of the P2 pole 228 is disposed upon the write gap layer 220.

With regard to the merged magnetic head 200 depicted in FIG. 6, it is to be understood that the magnetic shield structures 206 and 214 function with the same advantages as was described hereabove with regard to the device depicted in FIG. 4. Although the merged head depicted in FIG. 6 is shown to include the magnetic shield structure 164 depicted in FIG. 4, it will be obvious to those skilled in the art that the magnetic shield structure 186 depicted in FIG. 5 can be incorporated into the merged head. In this configuration, the laminated magnetic shield 132 would be fabricated upon the G2 insulation layer 128, the flux closure layer 216 would be fabricated upon the laminated magnetic shield 132, and the write gap layer 220 would be fabricated upon the flux closure layer 216. The further structures of the write head would then be fabricated upon the write gap layer 220, as is shown in FIG. 6. In a similar manner the magnetic shield structure 206 can be reconfigured such that the flux closure layer 212 is fabricated upon the insulation layer 112 and the laminated magnetic shield 208 is fabricated upon the flux closure layer 212, as has been depicted in FIG. 5 above.

Figure 7:
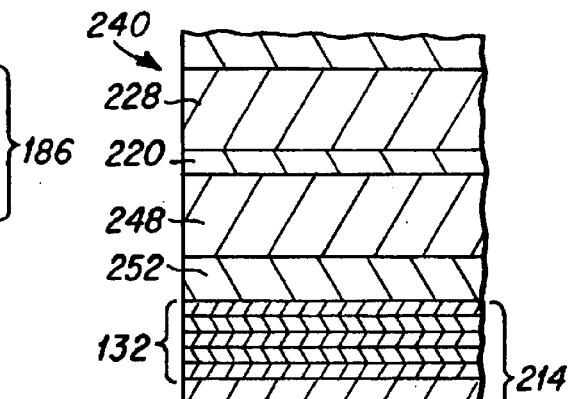
FIG. 7 depicts a piggy back magnetic head that may be used in a tape drive or hard disk drive of the present invention.

A further magnetic head design, 240 is depicted in FIG. 7. It is termed a piggy back head by those skilled in the art and it may be fabricated to advantageously utilize the magnetic shield structures 164 or 186 of the present invention. Particularly, in comparing the piggy back head 240 of FIG. 7 with the merged head 200 of FIG. 6, it is seen that the significant difference between the two magnetic head designs is that the piggy back head 240 includes a P1 pole 248 that is separated by an insulation layer 252 from the S2 shield 132; whereas, in the merged head of FIG. 6 the S2 shield and P1 pole are the same laminated structure 132. Therefore, as depicted in FIG. 7, a read head element is fabricated with structures numbered identically to those depicted in FIG. 6 through the fabrication of the magnetic shield structure 214 including the flux closure layer 212 and the laminated S2 shield 132. Thereafter, an insulation layer 252 is deposited upon the S2 shield 132 and a P1 magnetic pole 248 is next fabricated upon the insulation layer 252. Thereafter, a write gap layer 220 is deposited upon the P1 pole 248 and induction coil structures (not shown) and a P2 pole 228 are subsequently fabricated. Although the piggy back head 240 depicted in FIG. 7 is shown to include the magnetic shield structure 164 depicted in FIG. 4, it will be obvious to those skilled in the art that the magnetic shield structure 186 depicted in FIG. 5 can be incorporated into the piggy back head 240. In this configuration, the laminated magnetic shield 132 would be fabricated upon the G2 insulation layer 128, the flux closure layer 212 would be fabricated upon the laminated magnetic shield 132, and the insulation layer 252 would be fabricated upon the flux closure layer 212. The further structures of the write head would then be fabricated upon the insulation layer 252, as is shown in FIG. 7. In a similar manner, the S1 shield structure 206 can be fabricated with the flux closure layer 212 deposited first, followed by the laminated magnetic shield 208.

Figure 8:
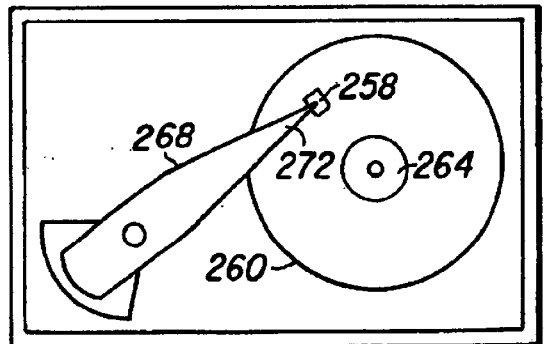
FIG. 8 is a schematic depiction of a hard disk drive including a magnetic head of the present invention.

As will be well understood by those skilled in the art, a piggy back magnetic head as depicted in FIG. 7, and a merged magnetic head 200 as depicted in FIG. 6 may be advantageously utilized as magnetic heads for a hard disk drive, and FIG. 8 is a schematic top plan view of a hard disk drive 256 including a magnetic head 258 of the present invention. As depicted therein, at least one hard disk 260 is rotatably mounted upon a motorized spindle 264. An actuator arm 268 is pivotally mounted within the hard disk drive 256 with a magnetic head of the present invention 258 disposed upon a distal end 272 of each actuator arm 268. A typical hard disk drive may include a plurality of disks 260 that are rotatably mounted upon the spindle 264 and a plurality of actuator arms 268 having a magnetic head mounted upon the distal end 272 of each of the actuator arms. As is well known to those skilled in the art, when the hard disk drive is operated, the hard disk 260 rotates upon the spindle and the magnetic head 258 acts as an air bearing slider that is adapted for flying above the surface of the rotating disk. The slider includes a substrate base upon which the various layers and structures that form the magnetic head 256 are fabricated. It is also to be understood that the present invention can be incorporated into magnetic heads that are used in hard disk drives (not shown) that employ contact recording technologies.

While the present invention has been shown and described with regard to certain preferred embodiments, it will be understood that those skilled in the art will no doubt develop certain alterations and modifications thereto which nevertheless include the true spirit and scope of the invention. It is therefore intended that the following claims cover all such alterations and modifications.

We claim:

1. A magnetic head, comprising:
   a sensor element;
   a magnetic shield being composed of magnetic material;
   a flux closure layer being composed of a relatively magnetically soft material, and being disposed directly upon said magnetic shield.

2. A magnetic head as described in claim 1 wherein said flux closure layer is disposed between said sensor element and said magnetic shield.

3. A magnetic head as described in claim 1 wherein said flux closure layer is disposed on a side of said magnetic shield that is away from said sensor element.

4. A magnetic head as described in claim 1 wherein said flux closure layer is comprised of NiFe or CZT or Ni.

5. A magnetic head as described in claim 4 wherein said magnetic shield is comprised of a plurality of laminated layers, including at least one FeN layer.

6. A magnetic head as described in claim 4 wherein said flux closure layer is comprised of a NiFe seed layer portion and a NiFe electroplated portion.

7. A magnetic head as described in claim 1 wherein said flux closure layer is formed with a thickness of from 100 nanometers to 5 micrometers.

8. A magnetic head comprising:
   a sensor element;
   an insulation layer being disposed upon said sensor element;
   a flux closure layer being composed of a magnetic material and being disposed upon said insulation layer,
   a magnetic shield being composed of magnetic material and being disposed directly upon said flux closure layer.

9. A magnetic head as described in claim 8 wherein said flux closure layer is comprised of NiFe.

10. A magnetic head as described in claim 9 wherein said flux closure layer is comprised of a NiFe seed layer portion and a NiFe electroplated portion.

11. A magnetic head as described in claim 9 wherein said magnetic shield is comprised of a plurality of laminated layers, including at least one FeN layer.

12. A magnetic head as described in claim 8 wherein said flux closure layer is formed with a thickness of from 100 nanometers to 5 micrometers.

13. A magnetic head comprising:
    a sensor element;
    an insulation layer being composed of magnetic material and being disposed upon said sensor element;
    a magnetic shield being disposed upon said insulation layer;
    a flux closure layer being composed of a magnetic material and being disposed directly upon said magnetic shield.

14. A magnetic head as described in claim 13 wherein said flux closure layer is comprised of NiFe or CZT or Ni.

15. A magnetic head as described in claim 14 wherein said flux closure layer is comprised of a NiFe seed layer portion and a NiFe electroplated portion.

16. A magnetic head as described in claim 14 wherein said magnetic shield is comprised of a plurality of laminated layers, including at least one FeN layer.

17. A magnetic head as described in claim 13 wherein said flux closure layer is formed with a thickness of from 100 nanometers to 5 micrometers.

18. A tape drive, including a tape head, comprising:
    a sensor element;
    a magnetic shield being composed of magnetic material;
    a flux closure layer being composed of a relatively magnetically soft material, and being disposed directly upon said magnetic shield.

19. A tape drive as described in claim 18 wherein said flux closure layer is disposed between said sensor element and said magnetic shield.

20. A tape drive as described in claim 18 wherein said flux closure layer is disposed on a side of said magnetic shield that is away from said sensor element.

21. A tape drive as described in claim 18 wherein said flux closure layer is comprised of NiFe or CTZ or Ni.

22. A tape drive as described in claim 21 wherein said flux closure layer is comprised of a NiFe seed layer portion and a NiFe electroplated portion.

23. A tape drive as described in claim 21 wherein said magnetic shield is comprised of a plurality of laminated layers, including at least one FeN layer.

24. A tape drive as described in claim 18 wherein said flux closure layer is formed with a thickness of from 100 nanometers to 5 micrometers.

25. A hard disk drive including a magnetic head, comprising:
    a sensor element;
    a magnetic shield being composed of magnetic material;
    a flux closure layer being composed of a relatively magnetically soft material, and being disposed directly upon said magnetic shield.

26. A hard disk drive as described in claim 25 wherein said flux closure layer is disposed between said sensor element and said magnetic shield.

27. A hard disk drive as described in claim 25 wherein said flux closure layer is disposed on a side of said magnetic shield that is away from said sensor element.

28. A hard disk drive as described in claim 25 wherein said flux closure layer is comprised of NiFe or CZT or Ni.

29. A hard disk drive as described in claim 28 wherein said flux closure layer is comprised of a NiFe seed layer portion and a NiFe electroplated portion.

30. A hard disk drive as described in claim 28 wherein said magnetic shield is comprised of a plurality of laminated layers, including at least one FeN layer.

31. A hard disk drive as described in claim 25 wherein said flux closure layer is formed with a thickness of from 100 nanometers to 5 micrometers.

* * * * *